United States Patent
Sundaram Ramasamy et al.

(10) Patent No.: US 12,179,691 B1
(45) Date of Patent: Dec. 31, 2024

(54) PYROTECHNICALLY ACTIVATED HOOK FOR SEATBELT ASSEMBLY

(71) Applicant: Ford Global Technologies, LLC, Dearborn, MI (US)

(72) Inventors: Murugan Sundaram Ramasamy, Canton, MI (US); Mangesh Kadam, Canton, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/473,683

(22) Filed: Sep. 25, 2023

(51) Int. Cl.
 B60R 22/195 (2006.01)

(52) U.S. Cl.
 CPC .................. B60R 22/1955 (2013.01)

(58) Field of Classification Search
 CPC ..... B60R 22/1955; B60R 22/20; B60R 22/26; B60R 2022/1818; B60N 2/688
 USPC ........................................................ 280/806
 See application file for complete search history.

(56) References Cited

U.S. PATENT DOCUMENTS

| | | | | |
|---|---|---|---|---|
| 5,431,448 | A * | 7/1995 | Ball | B60R 22/24 280/808 |
| 6,213,513 | B1 * | 4/2001 | Grabowski | B60R 22/1952 280/806 |
| 6,308,986 | B1 | 10/2001 | Townsend et al. | |
| 6,474,691 | B2 | 11/2002 | Izume et al. | |
| 6,572,147 | B2 | 6/2003 | Webber et al. | |
| 7,516,987 | B2 | 4/2009 | Koide et al. | |
| 8,376,407 | B2 * | 2/2013 | Adolfsson | B60R 22/18 297/480 |
| 8,851,522 | B1 | 10/2014 | Srugis et al. | |
| 9,725,022 | B2 | 8/2017 | Shenaq et al. | |
| 10,144,387 | B1 | 12/2018 | Jaradi et al. | |
| 10,988,062 | B2 | 4/2021 | Sekizuka | |
| 11,345,306 | B1 * | 5/2022 | Jaradi | B60R 22/3405 |
| 2002/0089164 | A1 | 7/2002 | Rouhana et al. | |
| 2010/0219667 | A1 * | 9/2010 | Merrill | B60R 22/195 297/480 |
| 2012/0025588 | A1 * | 2/2012 | Humbert | B60R 22/26 297/480 |
| 2019/0135227 | A1 | 5/2019 | Jaradi et al. | |
| 2020/0346603 | A1 * | 11/2020 | Freedman | B60R 21/02 |

FOREIGN PATENT DOCUMENTS

EP        0802096 B1    7/2001
KR     101232458 B1    2/2013

* cited by examiner

*Primary Examiner* — Toan C To
(74) *Attorney, Agent, or Firm* — Frank A. MacKenzie; Bejin Bieneman PLC

(57) ABSTRACT

A vehicle includes a vehicle seat having a first side and a second side spaced cross-seat from each other. A seatbelt buckle is fixed to the first side. A seatbelt assembly includes a latch plate engageable with the seatbelt buckle and a webbing having a lap portion defined by the latch plate when the latch plate is engaged with the seatbelt buckle. A hook is retractably supported by the second side of the vehicle seat. The hook is retractable relative to the vehicle seat from a first position to a retracted position. The hook is engageable with the lap portion of the webbing as the hook retracts. A lock includes a pin engageable with the hook when the hook is in the first position and the retracted position. A spring biases the pin toward the hook. A pyrotechnic device is operatively coupled to the lock to disengage the pin from the hook.

19 Claims, 8 Drawing Sheets

PYROTECHNICALLY ACTIVATED HOOK FOR SEATBELT ASSEMBLY

BACKGROUND

A vehicle includes a seatbelt assembly. The seatbelt assembly may include a seatbelt retractor and a webbing retractably payable from the seatbelt retractor. The seatbelt assembly includes an anchor coupled to the webbing, and a latch plate that engages a seatbelt buckle. The seatbelt assembly is disposed adjacent to a seat of the vehicle. The webbing extends continuously from the seatbelt retractor to the anchor. For example, one end of the webbing feeds into the seatbelt retractor, and the other end of the webbing is fixed to the anchor.

DETAILED DESCRIPTION

Figure 1:
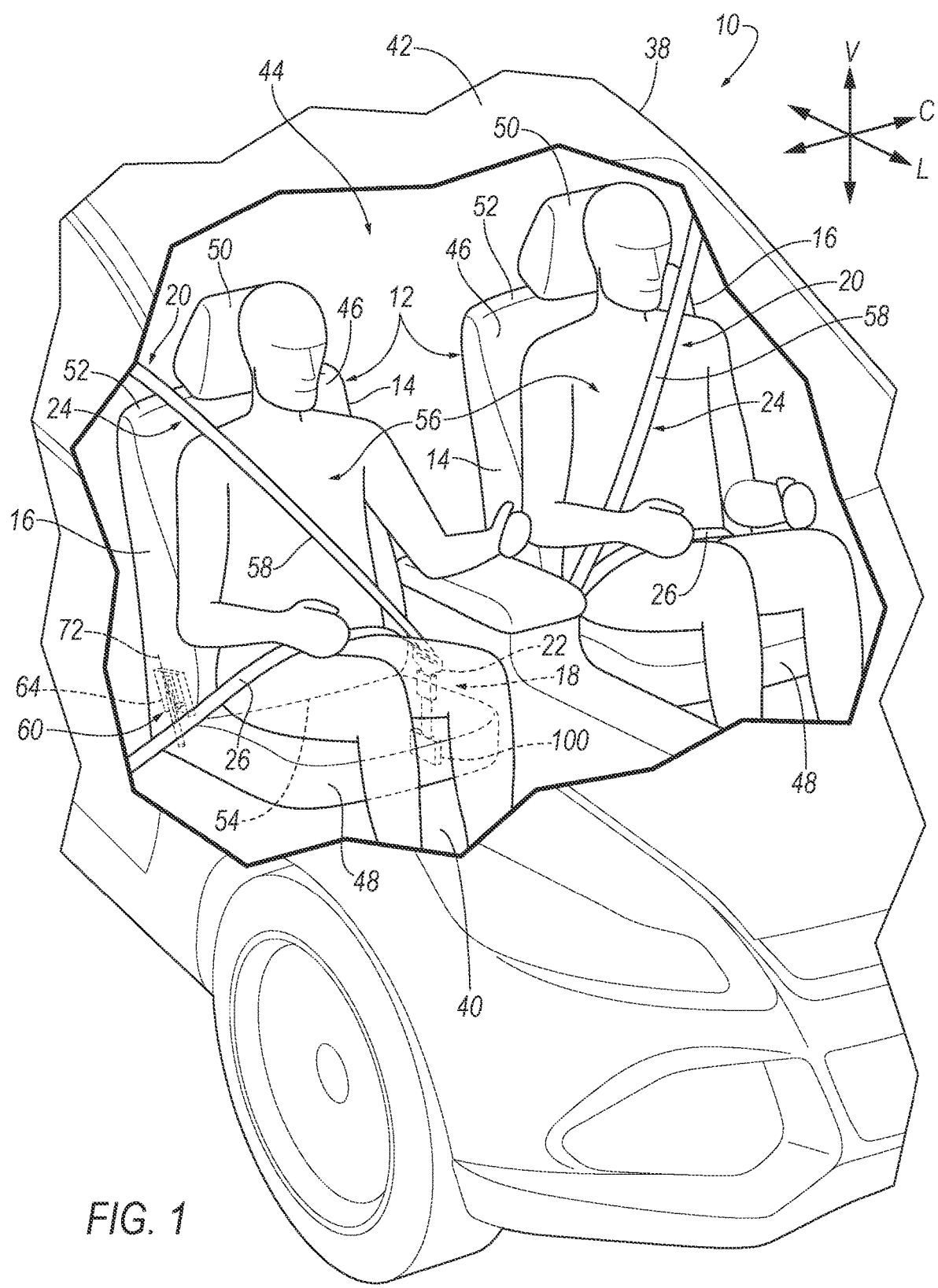
FIG. 1 is perspective view of a vehicle having a seatbelt assembly and a hook assembly supported by a seat.

A vehicle includes a vehicle seat having a first side and a second side spaced cross-seat from the first side. The vehicle includes a seatbelt buckle fixed to the first side of the vehicle seat. The vehicle includes a seatbelt assembly including a latch plate and a webbing. The latch plate is engageable with the seatbelt buckle. The webbing includes a lap portion defined by the latch plate when the latch plate is engaged with the seatbelt buckle. The vehicle includes a hook retractably supported by the second side of the vehicle seat. The hook is retractable relative to the vehicle seat from a first position to a retracted position and the hook is engageable with the lap portion of the webbing as the hook retracts from the first position to the retracted position. The vehicle includes a lock including a pin and a spring biasing the pin toward the hook. The pin is engageable with the hook when the hook is in the first position and the retracted position. The vehicle includes a pyrotechnic device operatively coupled to the lock to disengage the pin from the hook when the hook is in the first position.

The vehicle may include a second spring coupled to the hook. The second spring may bias the hook toward the retracted position.

The vehicle may include a track supported by the second side of the vehicle seat. The hook may be slidably supported by the track and the second spring may be between the track and the hook.

The hook may be retractable relative to the track from the first position to the retracted position by the second spring.

The hook may include an end and the track includes an end. The end of the hook may be spaced from the end of the track by a first distance in the first position and the end of the hook may be spaced from the end of the track by a second distance in the retracted position that is shorter than the first distance.

The second spring may extend from the end of the hook to the end of the track. The second spring may bias the end of the hook toward the end of the track.

The spring may be elongated along a first axis and the second spring may be elongated along a second axis transverse to the first axis.

The hook may define a first hole and a second hole spaced from the first hole along the first axis. The first hole and the second hole each may be elongated along the second axis.

The lock may include a housing. The pin may be slidable relative to the housing and the spring may be between the housing and the pin.

The pin may be movable from a first extended position to a retracted position when the hook is in the first position and the pin is movable from the retracted position to a second extended position when the hook is in the retracted position. The pyrotechnic device may be operatively coupled to the pin to move the pin from the first extended position to the retracted position and the spring biasing the pin toward the second extended position.

The vehicle may include a track supported by the second side of the vehicle seat. The hook may be retractable along the track from the first position to the retracted position.

The hook may include a first elongated portion, a second elongated portion spaced from the first elongated portion, and a curved portion between the first elongated portion and the second elongated portion. The first elongated portion may be slidably supported by the track.

The curved portion may be engageable with the lap portion of the webbing in the retracted position.

The lap portion of the webbing may be between the first elongated portion and the second elongated portion in the retracted position.

The hook may include an end and the track includes an end. The end of the hook may be spaced from the end of the track by a first distance in the first position and the end of the hook may be spaced from the end of the track by a second distance in the retracted position that is shorter than the first distance.

The hook may define a first hole and a second hole spaced from the first hole. The pin of the lock may be engageable with the first hole in the first position and the pin of the lock may be engageable with the second hole in the retracted position.

The hook may include a first elongated portion, a second elongated portion spaced from the first elongated portion, and a curved portion between the first elongated portion and the second elongated portion. The curved portion may be engageable with the lap portion of the webbing in the retracted position.

The lap portion of the webbing may be between the first elongated portion and the second elongated portion in the retracted position.

The vehicle may include a computer including a processor and a memory storing instructions executable by the processor to detect certain vehicle impacts and to actuate the pyrotechnic device to disengage the pin.

With reference to the Figures, wherein like numerals indicate like parts throughout the several views, a vehicle 10 includes a vehicle seat 12 having a first side 14 and a second side 16 spaced cross-seat from the first side 14. The vehicle 10 includes a seatbelt buckle 18 fixed to the first side 14 of the vehicle seat 12. The vehicle 10 includes a seatbelt assembly 20 including a latch plate 22 and a webbing 24. The latch plate 22 is engageable with the seatbelt buckle 18. The webbing 24 includes a lap portion 26 defined by the latch plate 22 when the latch plate 22 is engaged with the seatbelt buckle 18. The vehicle 10 includes a hook 28 retractably supported by the second side 16 of the vehicle seat 12. The hook 28 is retractable relative to the vehicle seat 12 from a first position to a retracted position and the hook 28 is engageable with the lap portion 26 of the webbing 24 as the hook 28 retracts from the first position to the retracted position. The vehicle 10 includes a lock 30 including a pin 32 and a spring, hereinafter referred to as the "first spring 34," biasing the pin 32 toward the hook 28. The pin 32 is engageable with the hook 28 when the hook 28 is in the first position and the retracted position. The vehicle 10 includes a pyrotechnic device 36 operatively coupled to the lock 30 to disengage the pin 32 from the hook 28 when the hook 28 is in the first position.

In the event of certain vehicle impacts, an occupant of the seat 12 may move seat-forward from the force of the vehicle impact. In the event of these certain vehicle impacts, the hook 28, as discussed further below, may retract relative to the seat 12 to engage the lap portion 26 of the webbing 24 to move the lap portion 26 of the webbing 24 downwardly along the torso of the occupant.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle defines a cross-vehicle axis C extending cross-vehicle from one side to the other side of the vehicle 10. The vehicle 10 defines a vertical axis V. The vehicle-longitudinal axis L, the cross-vehicle axis C, and the vertical axis V are perpendicular relative to each other.

As described further below, the vehicle 10 includes a vehicle body 38 including rockers (not numbered), roof rails (not shown), roof beams (not shown), pillars (not numbered), body panels (not numbered), vehicle floor 40, vehicle roof 42, etc. The vehicle 10 includes a passenger compartment 44 to house occupants, if any, of the vehicle 10. The passenger compartment 44 may extend across the vehicle 10, i.e., from one side to the other side of the vehicle 10. The passenger compartment 44 includes a front end (not numbered) and a rear end (not shown) with the front end being in front of the rear end during forward movement of the vehicle 10.

The vehicle roof 42 and the vehicle floor 40 are spaced from each other. Specifically, the vehicle floor 40 is spaced downwardly from the vehicle roof 42. The vehicle roof 42 defines the upper boundary of the passenger compartment 44 and may extend from the front end of the passenger compartment 44 to the rear end of the passenger compartment 44. The vehicle roof 42 may include a roof panel (not numbered) extending from one side of the vehicle 10 to the other. As an example, the roof panel may be attached to roof rails, e.g., by welding, fasteners, etc.

The vehicle 10 includes the vehicle floor 40 defining the lower boundary of the passenger compartment 44 and may extend from the front end of the passenger compartment 44 to the rear end of the passenger compartment 44. The vehicle floor 40 may include upholstery, for example, carpet, and may have a class-A surface facing the passenger compartment 44, i.e., a surface specifically manufactured to have a high quality, finished, aesthetic appearance free of blemishes.

Figure 2:
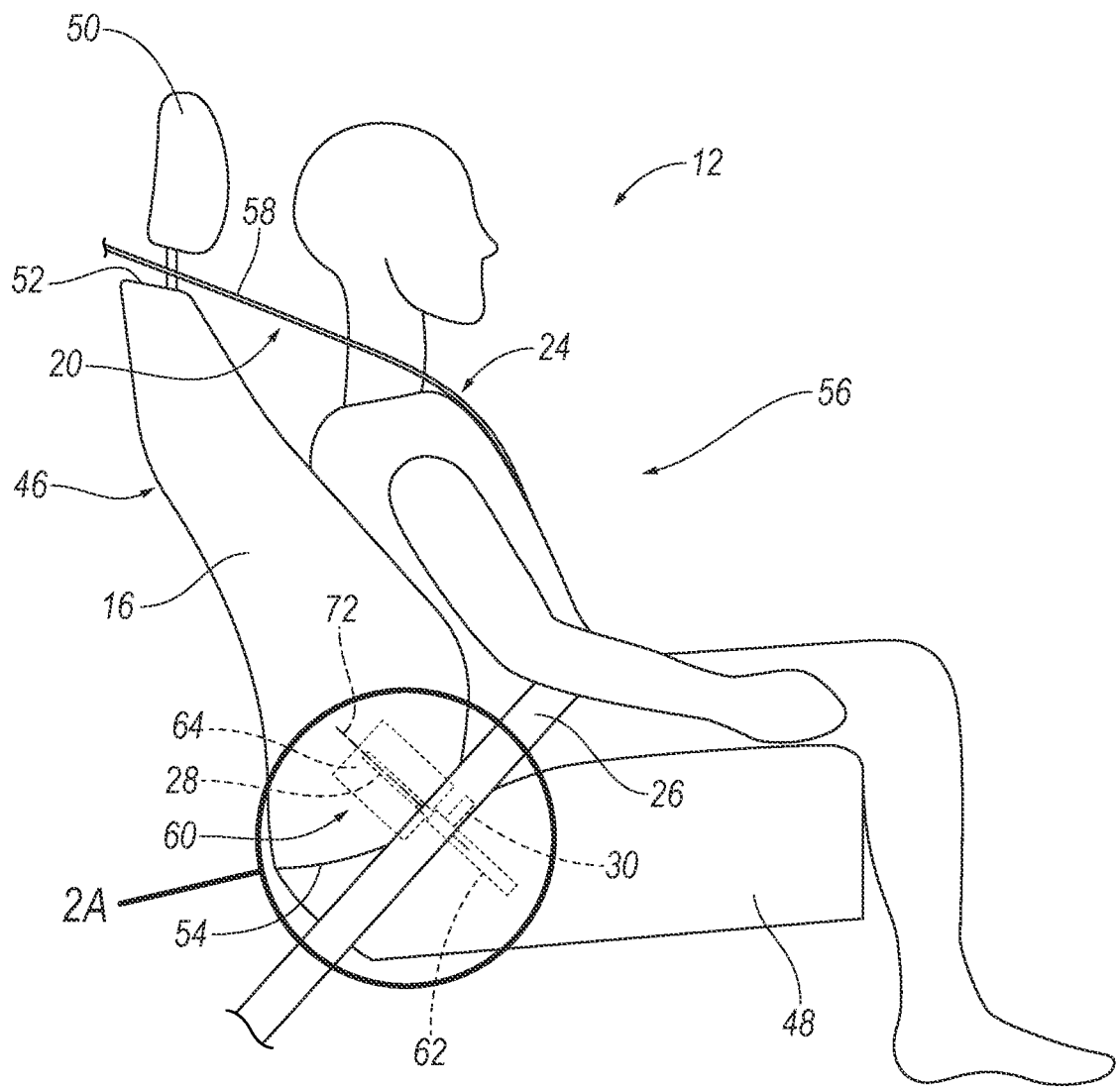
FIG. 2 is a side view of the hook assembly in a first position.
Figure 2A:
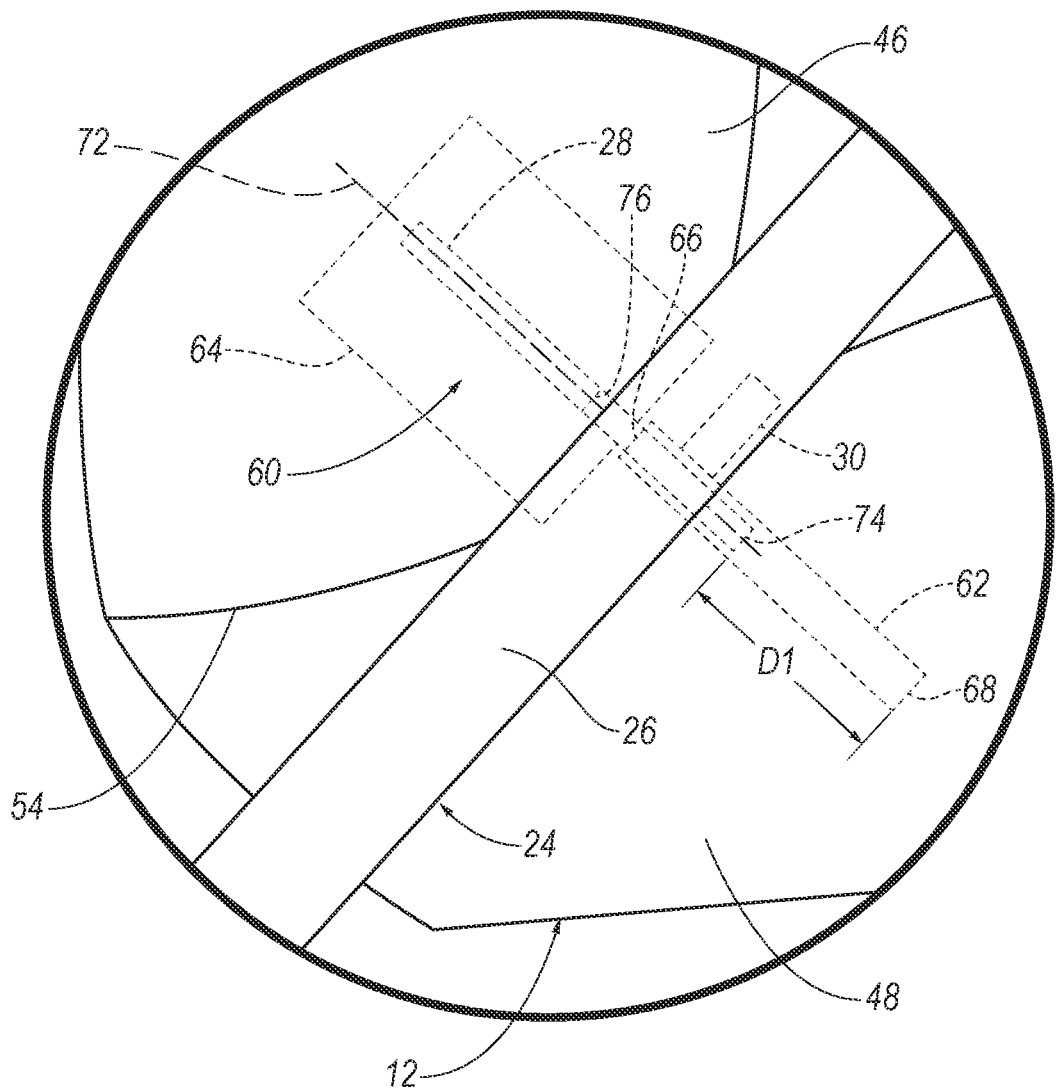
FIG. 2A is a side view of the hook assembly in the first position.
Figure 3:
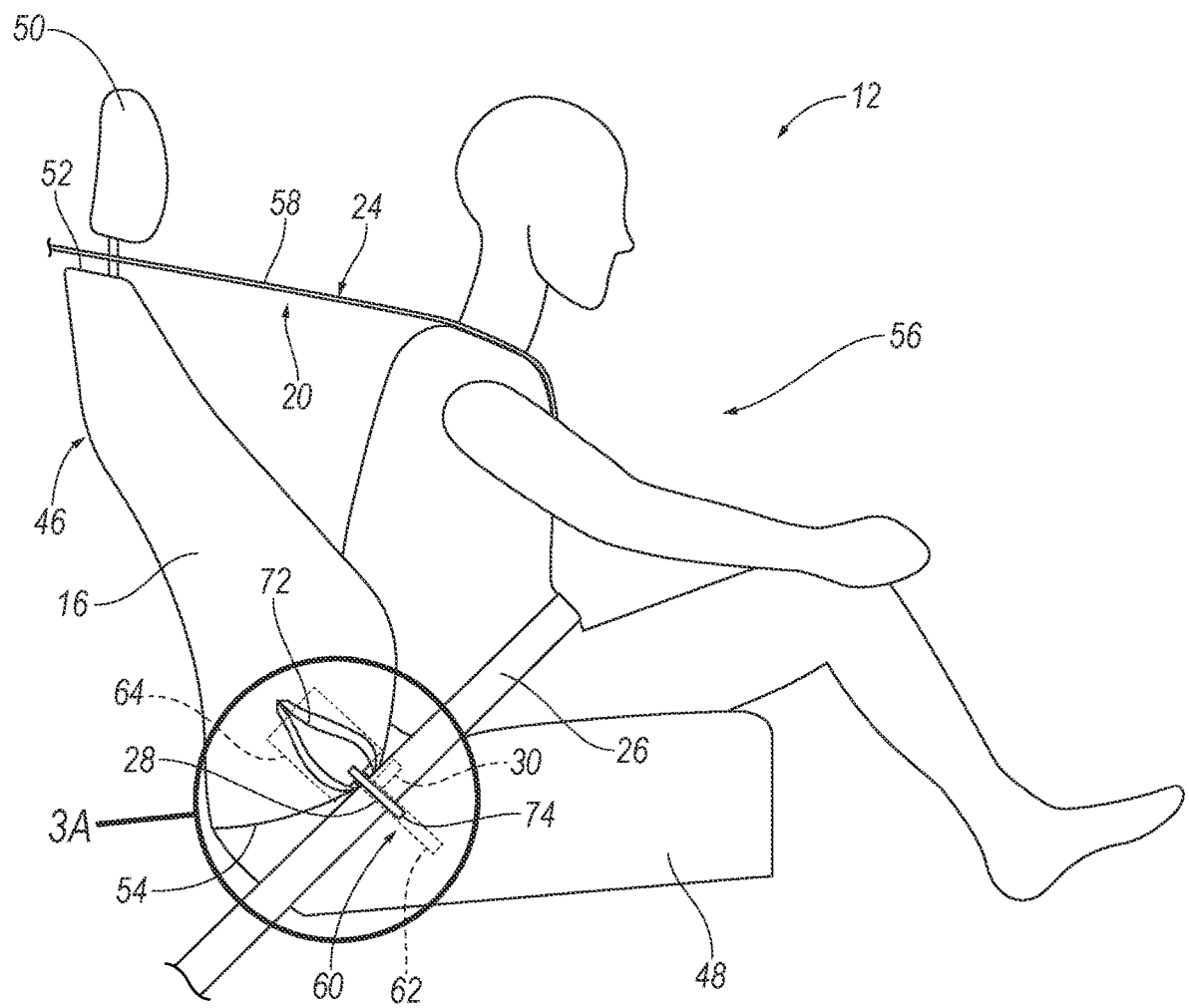
FIG. 3 is a side view of the hook assembly in a retracted position following certain vehicle impacts.
Figure 3A:
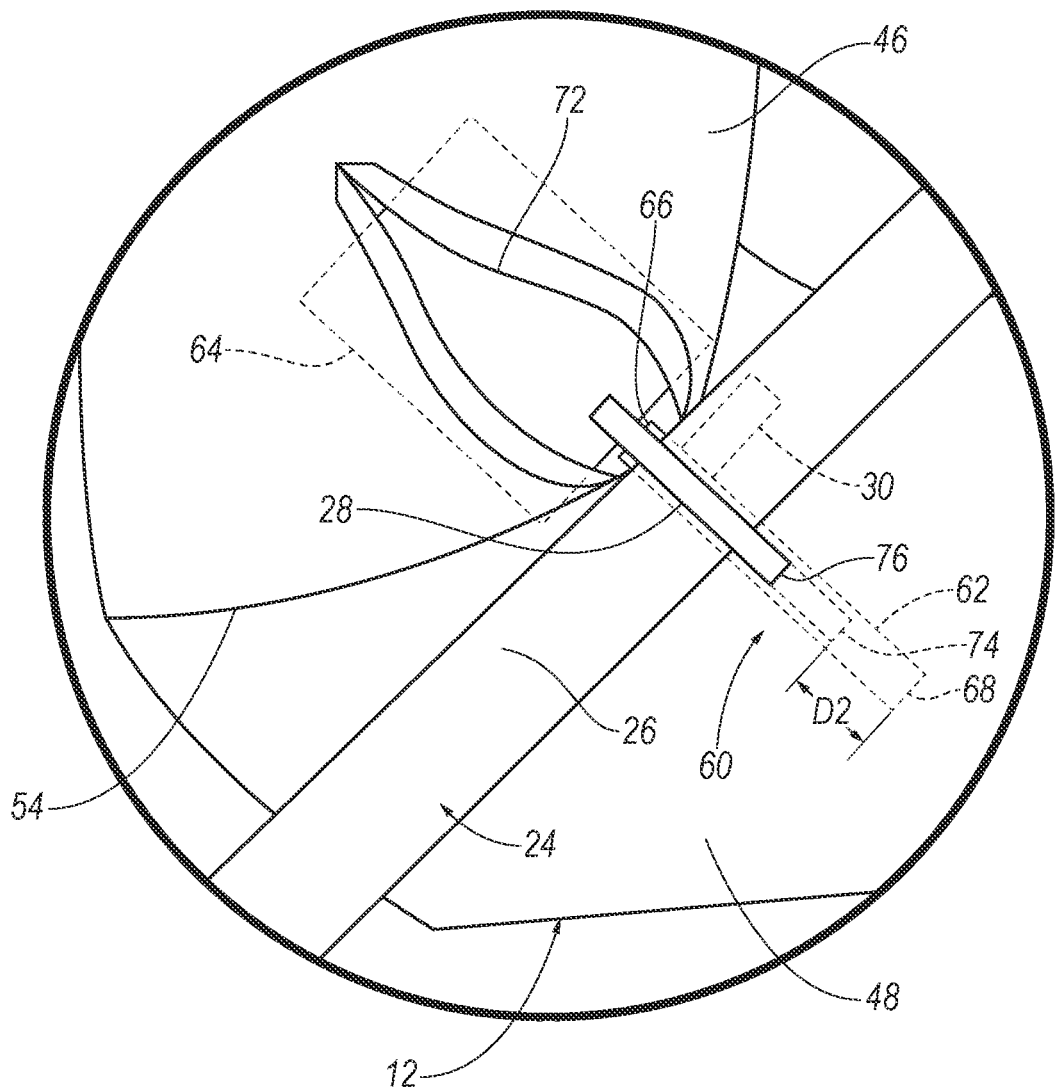
FIG. 3A is a side view of the hook assembly in the retracted position.

With reference to FIGS. 1-3, the vehicle 10 may include one or more vehicle seats 12, hereinafter referred to as "seat 12." Specifically, the vehicle 10 may include any suitable number of seats 12. As shown in FIG. 1, the seats 12 are supported by the vehicle floor 40. The seats 12 may be arranged in any suitable arrangement in the passenger compartment 44. As in the example shown in the Figures, one or more of the seats 12 may be at the front end of the passenger compartment 44, e.g., a driver seat and/or a passenger seat. In other examples, one or more of the seats 12 may be behind the front end of the passenger compartment 44, e.g., at the rear end of the passenger compartment 44. The seats 12 may be movable relative to the vehicle floor 40 to various positions, e.g., movable fore-and-aft and/or cross-vehicle. The seat 12 may be of any suitable type, e.g., a bucket seat.

The seats 12 include a seatback 46, a seat bottom 48, and a head restraint 50. The head restraint 50 may be supported by and extending upwardly from the seatback 46. The head restraint 50 may be stationary or movable relative to the seatback 46. The seatback 46 may be supported by the seat bottom 48 and may be stationary or movable relative to the seat bottom 48. The seatback 46, the seat bottom 48, and the head restraint 50 may be adjustable in multiple degrees of freedom. Specifically, the seatback 46, the seat bottom 48, and the head restraint 50 may themselves be adjustable. In other words, adjustable components within the seatback 46, the seat bottom 48, and the head restraint 50 may be adjustable relative to each other.

The seats 12 includes the first side 14 and the second side 16 spaced cross-seat from the first side 14. In the example shown in the Figures, the first side 14 and the second side 16 are spaced cross-vehicle from each other. For example, the first side 14 is vehicle-inboard of the second side 16 and the second side 16 is vehicle-outboard of the first side 14. The second side 16 may be adjacent a door (not numbered) of the vehicle 10 and the first side 14 may be spaced vehicle-inboard from the door of the vehicle 10. The first side 14 and the second side 16 may extend from a top 52 of the seat 12 to a bottom 54 of the seat 12. In other words, the first side 14 and the second side 16 may include a portion of all of the head restraint 50, the seatback 46, and the seat bottom 48.

The seatback 46 and/or the seat bottom 48 includes a seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 46 is in a generally upright position. The upright frame members are spaced from each other and the seat frame includes one or more cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seatback 46 and the seat bottom 48 define an occupant-seating area 56 of the seat 12. The occupant-seating area 56 is the area occupied by an occupant when properly seated on the seat bottom 48 and the seatback 46. The occupant-seating area 56 is in a seat-forward direction of the seatback 46 and above the seat bottom 48. In the example shown in the Figures, the occupant-seating area 56 faces the front end of the passenger compartment 44 when the seat 12 is in the forward-facing position and the occupant-seating area 56 faces the rear end of the passenger compartment 44 when the seat 12 is in the rearward-facing position.

The vehicle 10 includes the seatbelt assembly 20 that includes a retractor (not shown), the webbing 24, and the latch plate 22. The webbing 24 is retractably payable from the retractor. The seatbelt assembly 20 may include an anchor (not shown) fixed relative to the seat 12. In some examples, the anchor may be fixed to the seat 12, e.g., the seat bottom 48. In other examples, the anchor may be fixed to other components of the vehicle 10, e.g., the vehicle floor 40, pillars, etc. The anchor is coupled to the webbing 24 and the anchor fixes at least one end of the webbing 24 relative to the seat 12. The latch plate 22 is engageable with the seatbelt buckle 18. In other words, the webbing 24 is engageable with the seatbelt buckle 18. The seatbelt buckle 18 is fixed to the first side 14 of the seat 12. In other words, the seatbelt buckle 18 is fixed to the side of the seat 12 that is opposite the seatbelt assembly 20. The latch plate 22 may be movable from an unbelted position to a belted position. In other words, the latch plate 22 may be engaged with the seatbelt buckle 18 in the belted position and the latch plate 22 may be disengaged with the seatbelt buckle 18 in the unbelted position.

The seatbelt assembly 20 may control the kinematics of the occupant of the seat 12, e.g., during sudden decelerations of the vehicle 10. The webbing 24 may extend continuously from the retractor to the anchor. For example, one end of the webbing 24 feeds into the retractor and the other end of the webbing 24 is fixed to the anchor. The webbing 24 may be fabric, e.g., woven polyester. The webbing 24 is dividable into the lap portion 26 and a shoulder portion 58. The lap portion 26 and the shoulder portion 58 are defined by the latch plate 22 when the latch plate 22 is engaged with the seatbelt buckle 18. In the belted position, the lap portion 26 may extend along a lap of an occupant of the seat 12 and the shoulder portion 58 may extend along a shoulder of the occupant of the seat 12. Specifically, the latch plate 22 divides the webbing 24 into the lap portion 26 and the shoulder portion 58 and the latch plate 22 may move freely along the webbing 24. The lap portion 26 extends from the retractor to the seatbelt buckle 18 and the shoulder portion 58 extends from the seatbelt buckle 18 to the anchor.

In the event of certain vehicle impacts, an occupant of the seat 12 may move seat-forward from the force of the vehicle impact. In the event of certain vehicle impacts, the hook 28, as discussed further below, may retract relative to the seat 12 to engage the lap portion 26 of the webbing 24 to move the lap portion 26 of the webbing 24 downwardly along the torso of the occupant.

With reference to FIGS. 2A, 3A, and 4A-4C, the vehicle 10 includes a hook assembly 60. The hook assembly 60 includes the hook 28, the lock 30, the pyrotechnic device 36, and may include a track 62. The hook assembly 60 is supported by the seat 12. The hook assembly 60 is fixed relative to the seat 12, e.g., the hook assembly 60 is fixed to the seat 12. In some examples, such as shown in the Figures, the hook assembly 60 is supported by the seatback 46. In such an example, the hook assembly 60 is fixed to the seat frame of the seatback 46 between the seat frame and the covering of the seat 12. In other examples, the hook assembly 60 may be supported by the seat bottom 48. In such an example, the hook assembly 60 is fixed to the seat frame of the seat bottom 48 between the seat frame and the covering of the seat 12. In yet further examples, the hook assembly 60 may be supported by any suitable portion of the seat 12. In either example discussed above, the covering of the seat 12 may include a cavity 64 surrounding the hook assembly 60 to allow movement of the seat 12 around the hook assembly 60 and the covering may include a releasable seam 72, e.g., a tear seam, adjacent the hook assembly 60. When the hook 28 moves to the retracted position, the hook 28 may release the releasable seam 72 to allow the hook 28 to engage the lap portion 26 of the webbing 24.

As discussed above, the hook assembly 60 is supported by the seat 12. In other words, the hook 28 is supported by the seat 12. The track 62 is fixed to the seat 12 and the hook 28 is movable relative to the track 62. Specifically, the hook 28 and the track 62 are supported by the second side 16 of the seat 12. In other words, the track 62 and hook 28 are supported by an opposite side of the seat 12 from the seatbelt buckle 18. The occupant-seating area 56 of the seat 12 is between the hook 28 and the track 62 and the seatbelt buckle 18. In other words, the occupant of the seat 12 is seated between the hook 28 and the track 62 and the seatbelt buckle 18.

The track 62 is fixed to the second side 16 of the seat 12. The track 62 is elongated along an axis A from a top end 66 to a bottom end 68 spaced from the top end 66. The hook 28 is slidable relative to the seat 12. Specifically, the hook 28 is slidably supported by the track 62. In the event of certain vehicle impacts, the hook 28 is slidable along the track 62 and along the axis A. The hook 28 moves from the first position to the retracted position along the track 62. The track 62 may include an opening 70 at the top end 66 that receives the hook 28 to allow the hook 28 to slide along the track 62 from the first position to the retracted position. The hook 28 is engageable with the webbing 24 of the seatbelt assembly 20 when the hook 28 is in the retracted position. Specifically, the hook 28 is engageable with the lap portion 26 of the webbing 24 as the hook 28 retracts from the first position to the retracted position.

The hook 28 is elongated from a first end 74 to a second end 76 and the hook 28 is generally "U-shaped." In other words, the hook 28 includes a first elongated portion 78, a second elongated portion 80, and a curved portion 82. The first elongated portion 78 and the second elongated portion 80 are each elongated along the axis A. The first elongated portion 78 and the second elongated portion 80 are spaced from each other. Specifically, the first elongated portion 78 extends along the axis A and the second elongated portion 80 is spaced from the axis A. The lap portion 26 of the webbing 24 is between the first elongated portion 78 and the second elongated portion 80 when the hook 28 is in the retracted position. The curved portion 82 is between the first elongated portion 78 and the second elongated portion 80. The first elongated portion 78 extends from the first end 74 to the curved portion 82. The curved portion 82 extends from the first elongated portion 78 to the second elongated portion 80. The curved portion 82 is engageable with the lap portion 26 of the webbing 24 in the retracted position. In other words, as the hook 28 moves to the retracted position, the curved portion 82 contacts the webbing 24 to move the lap portion 26 downwardly along the seatback 46 and the occupant. The second elongated portion 80 extends from the curved portion 82 to the second end 76. The first elongated portion 78 and the second elongated portion 80 may each be elongated linearly. The first elongated portion 78 is slidably supported by the track 62. Specifically, the first elongated portion 78 is slidable along the track 62 from the first position to the retracted position.

As discussed above, the hook 28 is slidable relative to the seat 12 and along the track 62. Specifically, the hook 28 is retractable relative to the seat 12. The hook 28 is retractably supported by the second side 16 of the seat 12. In other words, the hook 28 retracts from the first position to the retracted position. Specifically, the hook 28 is retractable along the track 62 from the first position to the retracted position. In the event of certain vehicle impacts, the hook 28 retracts from the first position to the retracted position.

The hook assembly 60 includes the lock 30 engageable with the hook 28. The lock 30 engages with the hook 28 to maintain the hook 28 in the first position during normal operation of the vehicle 10. In the event of certain vehicle impacts, the lock 30 disengages the hook 28 to allow the hook 28 to retract to the retracted position. After the hook 28 reaches the retracted position, the lock 30 re-engages the hook 28 to maintain the hook 28 in the retracted position.

The lock 30 includes the pin 32, the first spring 34, and a housing 84. The pin 32 slidable relative to the housing 84. In the example shown in the Figures, the pin 32 is slidable relative to the housing from a first extended position to a retracted position and from the retracted position to a second extended position.

The first spring 34 is between the pin 32 and the housing 84. The first spring 34 is elongated along an axis B. The axis B is transverse to the axis A. In other words, the axis B and the axis A intersect each other. The first spring 34 biases the pin 32 away from the housing 84 and toward the hook 28. Specifically, the first spring 34 biases the pin 32 toward the first extended position and the second extended position. In other words, the first spring 34 biases the pin 32 along the axis B toward the hook 28.

The pin 32 is engageable with the hook 28. Specifically, the pin 32 is engageable with the first elongated portion 78 of the hook 28. In the example shown in the Figures, the pin 32 is engaged with the hook 28 when the pin 32 is in the first extended position and when the pin 32 is in the second extended position. In such an example, the hook 28 may include a first hole 86 and a second hole 88 spaced from the first hole 86 along the axis A. Specifically, the first elongated portion 78 may include the first hole 86 and the second hole 88 spaced from each other along the first elongated portion 78. Each of the first hole 86 and the second hole 88 are elongated along the axis B. The pin 32 is engageable with the first hole 86 and the second hole 88 to maintain the hook 28 in the first position and the retracted position. Specifically, the pin 32 is engageable with the first hole 86 when the hook 28 is in the first position and the pin 32 is in the first extended position and the pin 32 is engageable with the second hole 88 when the hook 28 is in the retracted position and the pin 32 is in the second extended position. In other words, the pin 32 is movable from the first extended position to the retracted position when the hook 28 is in the first position and the pin 32 is movable from the retracted position to the second extended position when the hook 28 is in the retracted position. During normal operation of the vehicle 10, the pin 32 is engaged with the first hole 86 to maintain the hook 28 in the first position. In the event of certain vehicle impacts, the pin 32 disengages with the first hole 86 and the pin 32 moves to the retracted position to allow the hook 28 to move from the first position to the retracted position and the pin 32 moves to the second extended position to re-engage the hook 28 at the second hole 88 to maintain the hook 28 in the retracted position.

The hook assembly 60 includes the pyrotechnic device 36 operatively coupled to the lock 30 to disengage the pin 32 from the hook 28. In the example shown in the Figures, the pyrotechnic device 36 is operatively coupled to the pin 32 to retract the pin 32 from the first hole 86. In the event of certain vehicle impacts, the pyrotechnic device 36 activates to retract the pin 32 away from the hook 28 to allow hook 28 to move to the retracted position. In the event of certain vehicle impacts, the pyrotechnic device 36 includes a pyrotechnic charge that activates to move the pin 32 from the first extended position to the retracted position. The pyrotechnic charge overcomes force of the first spring 34 to move the pin 32 to the retracted position. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

In another example, not shown in the Figures, the pin 32 may be engaged with the hook 28 in the first extended position and the pyrotechnic device 36 may break the pin 32 to disengage the pin 32 from the hook 28. In such an example, the pyrotechnic device 36 does not retract the pin 32 from the hook, but rather, the pyrotechnic device 36 separates at least a portion of the pin 32 from the hook to disengage the pin 32 from the hook 28. After the pyrotechnic device 36 activates, the first spring 34 biases the remainder of the pin 32 toward the hook 28 to reengage the pin 32 with the hook 28.

After the pyrotechnic device 36 is activated, the pin 32 is disengaged from the first hole 86 and moves to the retracted position. The hook 28 retracts along the track 62 to the retracted position. After the hook 28 reaches the retracted position, the first spring 34 biases the pin 32 toward the hook 28. In other words, the first spring 34 biases the pin 32 toward the second extended position. Specifically, the first spring 34 biases the pin 32 into the second hole 88 to maintain the hook 28 in the retracted position.

As discussed above, the hook 28 is retractable from the first position to the retracted position. Specifically, the hook 28 is retractable relative to the track 62 from the first position to the retracted position. In other words, the hook 28 is retractable along the track 62 from the first position to the retracted position. The hook assembly 60 includes a second spring 90 between the hook 28 and the track 62 may bias the hook 28 toward the retracted position. Specifically, the second spring 90 extends from the first end 74 of the hook 28 to the bottom end 68 of the track 62. The second spring 90 extends along the axis A and along the track 62. The second spring 90 is coupled to the hook 28 to move the hook 28 to the retracted position after the pin 32 is disengaged from the first hole 86 of the hook 28. As the pin 32 moves to the retracted position, the hook 28 moves along the track 62 toward the retracted position. In other words, the hook 28 is retractable relative to the track 62 from the first position to the retracted position by the second spring 90.

Figure 4C:
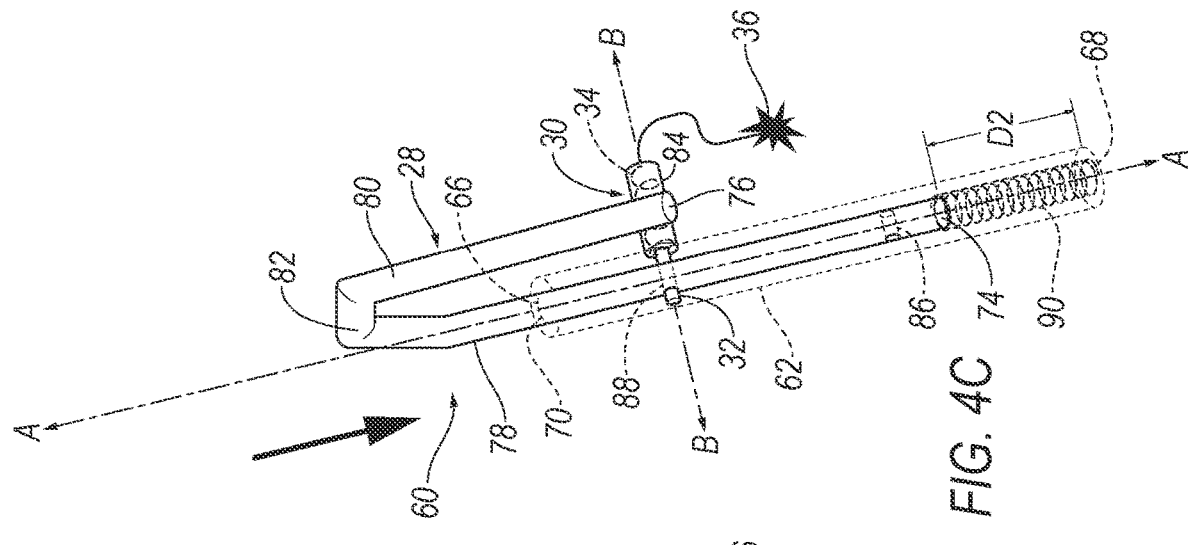
FIG. 4C is a perspective view of the hook assembly in the retracted position.
Figure 4B:
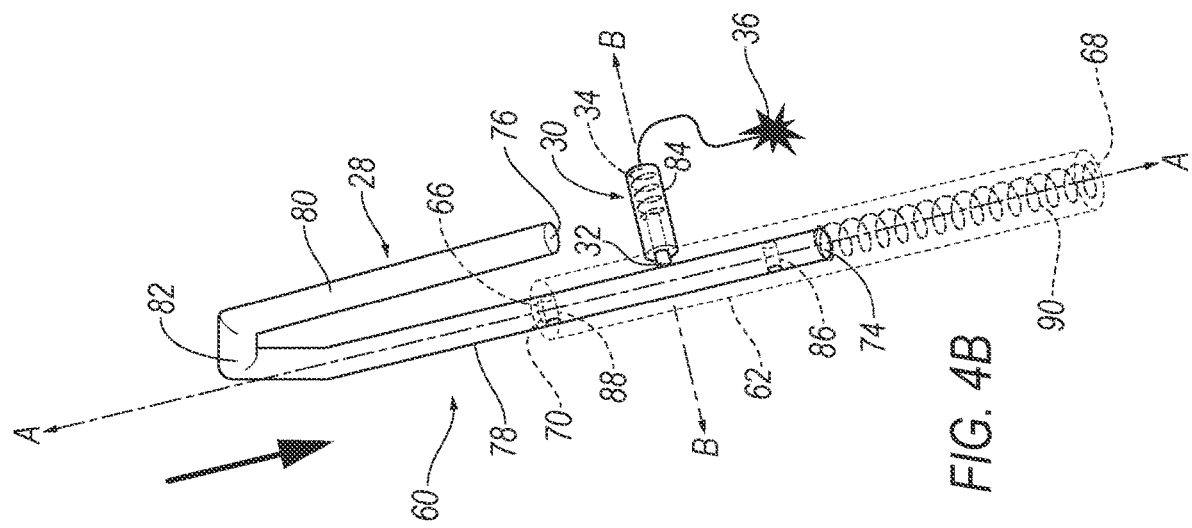
FIG. 4B is a perspective view of the hook assembly between the extended position and the retracted position.
Figure 4A:
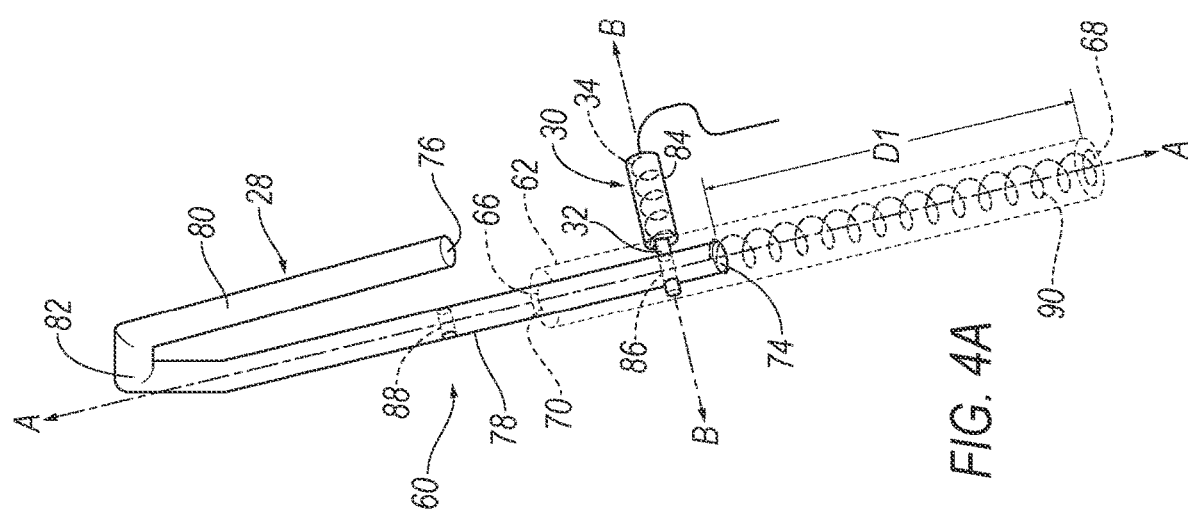
FIG. 4A is a perspective view of the hook assembly in the extended position.

With reference to FIGS. 4A-4C, the second spring 90 biases the first end 74 of the hook 28 toward the bottom end 68 of the track 62. In other words, the second spring 90 is under tension between the first end 74 of the hook 28 and the bottom end 68 of the track 62. When the hook 28 is in the first position, the first end 74 of the hook 28 is spaced from the bottom end 68 of the track 62 by a first distance D1. When the hook 28 is in the retracted position, the first end 74 of the hook 28 is spaced from the bottom end 68 by a second distance D2. The second distance D2 is shorter than the first distance D1. In other words, the first end 74 of the hook 28 moves toward the bottom end 68 of the track 62 such that the first end 74 of the hook 28 is closer in proximity to the bottom end 68 when the hook 28 is in the retracted position compared to the first position.

In the event of certain vehicle impacts, in the example shown in the Figures, the pyrotechnic device 36 activates to move the pin 32 from the first extended position to the retracted position. In other words, the pin 32 is disengaged from the first hole 86 of the hook 28. After the pin 32 is disengaged from the first hole 86, the second spring 90 biases the hook 28 toward the retracted position. As the hook 28 moves toward the retracted position, the hook 28 engages the lap portion 26 of the webbing 24 to move the lap portion 26 away from the seatback 46 and down the torso of the occupant of the seat 12. After the hook 28 reaches the retracted position, the first spring 34 biases the pin 32 toward the second extended position. The pin 32 moves from the retracted position and into the second extended position. The pin 32 moves into the second hole 88 in the second extended position. The pin 32 maintains the hook 28 in the retracted position and maintains engagement with the lap portion 26 of the webbing 24.

In combination with the hook 28 retracting along the track 62, the seatbelt buckle 18 may be rotatable relative to the seat 12 away from the seatback 46. Rotation of the seatbelt buckle 18 moves the lap portion 26 of the webbing 24 seat-forward. The seatbelt buckle 18 may be coupled to a suitable mechanism 100 to rotate the seatbelt buckle 18. In some examples, the seatbelt buckle 18 may be pyrotechnically rotatable in the event of certain vehicle impacts. Specifically, the mechanism 100 may include or may be a pyrotechnic actuator between the seatbelt buckle 18 and the seat 12 that is operatively connected to the seatbelt buckle 18 to rotate the seatbelt buckle 18 relative to the seat 12. In such an example, the seatbelt buckle 18 may rotate simultaneously with the hook 28 retracting along the track 62 in the event of certain vehicle impacts. In other examples, the mechanism 100 may include a motor, e.g., a DC motor or any other suitable motor, operatively connected to the seatbelt buckle 18 to rotate the seatbelt buckle 18 relative to the seat. In such an example, the motor may rotate the seatbelt buckle 18 prior to certain vehicle impacts.

Figure 5:
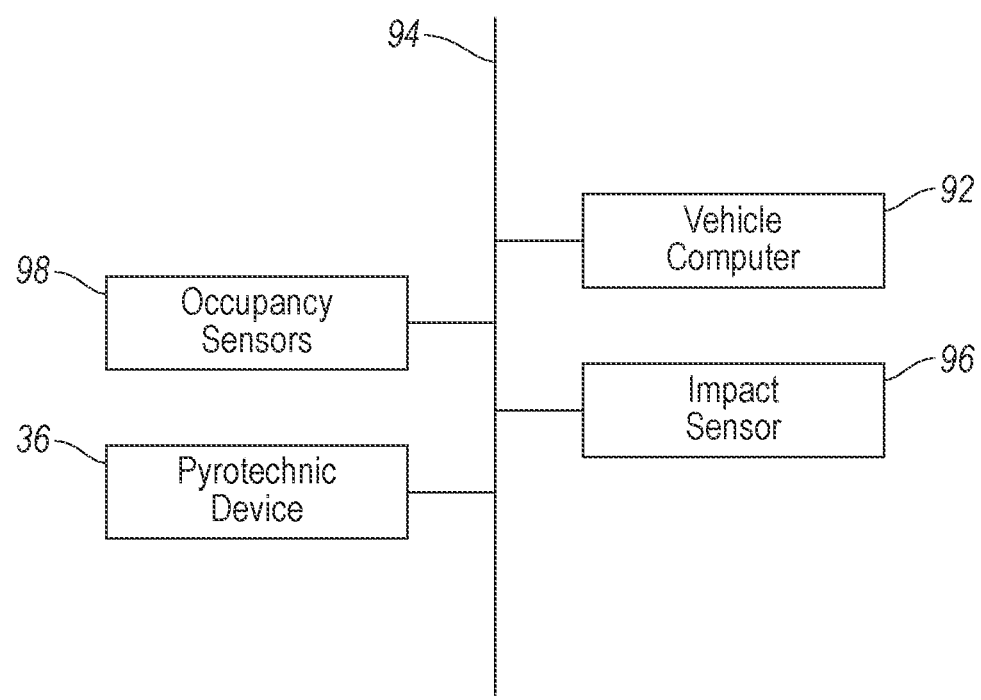
FIG. 5 is a block diagram of a vehicle communication network of the vehicle.

With reference to FIG. 5, the vehicle 10 includes a vehicle computer 92 including a processor and a memory storing instructions executable by the processor. The memory includes one or more forms of computer readable media, and stores instructions executable by the vehicle computer 92 for performing various operations, including as disclosed herein. The vehicle computer 92 may be a restraints control module. The vehicle computer 92 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 92 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 92.

The vehicle computer 92 is generally arranged for communications on a vehicle communication network 94 that can include a bus in the vehicle 10 such as a controller area network CAN or the like, and/or other wired and/or wireless mechanisms. Alternatively or additionally, in cases where the vehicle computer 92 includes a plurality of devices, the vehicle communication network 94 may be used for communications between devices represented as the vehicle computer 92 in this disclosure. Further, as mentioned below, various controllers and/or sensors may provide data to the vehicle computer 92 via the vehicle communication network 94.

The vehicle 10 may include at least one impact sensor 96 for sensing certain vehicle impacts (e.g., impacts of a certain magnitude, direction, etc.). The impact sensor 96 may be configured to sense certain vehicle impacts prior to impact, i.e., pre-impact sensing. The impact sensor 96 may be in communication with the vehicle computer 92. The impact sensor 96 is configured to detect certain vehicle impacts. In other words, a "certain vehicle impact" is an impact of the type and/or magnitude for which the hook 28 moves to the retracted position, i.e., "certain" indicates the type and/or magnitude of the impact. The type and/or magnitude of such "certain vehicle impacts" may be prestored in the vehicle computer 92, e.g., a restraints control module. The impact sensor 96 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 96 may be located at numerous points in or on the vehicle 10.

The vehicle 10 may include at least one occupancy sensor 98. The occupancy sensor 98 is configured to detect occupancy of the seats 12, e.g., detect an occupant in the occupant-seating area 56. The occupancy sensor 98 may be visible-light or infrared cameras directed at the seat 12, weight sensors supported by the seat bottom 48, sensors detecting whether the seatbelt assembly 20 for the seat 12 is buckled, or other suitable sensors. The occupancy sensor 98 provides data to the computer specifying whether the seat 12 is occupied or unoccupied and information regarding the type of occupant. As one example, the vehicle 10 may include one occupancy sensor 98 for each occupant-seating area 56. As another example, the vehicle 10 may include one occupancy sensor 98 that is designed to individually detect occupancy of each occupant-seating area 56.

Figure 6:
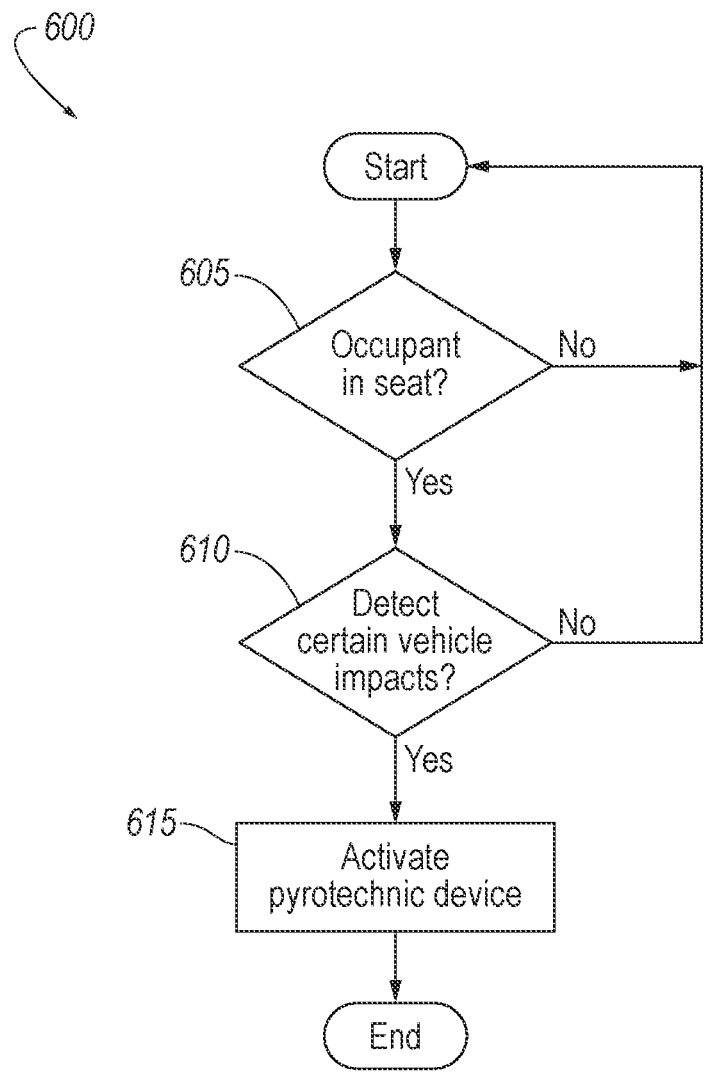
FIG. 6 is a flowchart of a method executable by a vehicle computer.

With reference to FIG. 6, the vehicle computer 92 stores instructions to control components of the vehicle 10 according to the method 600. Specifically, as shown in FIG. 6, the method 600 includes detecting certain vehicle impacts to activate the pyrotechnic device 36. Use of "in response to," "based on," and "upon determining" herein indicates a causal relationship, not merely a temporal relationship.

With reference to decision block 605, the method includes determining that an occupant is seated in the occupant-seating area 56 of the seat 12. The occupancy sensors 98 may send a signal to the vehicle computer 92 indicating an occupant is seated in the occupant-seating area 56. If no occupant is determined to be seated in the occupant-seating area 56, the method 600 returns to its start. If an occupant is determined to be seated in the occupant-seating area 56, the method 600 continues to decision block 610.

With reference to decision block 610, in response to the determination that an occupant is seated in the occupant-seating area 56, the method 600 includes detecting certain vehicle impacts. The impact sensor 96 may send a signal to the vehicle computer 92 in the event of certain vehicle impacts. If no vehicle impact is detected, the method 600 returns to its start. If certain vehicle impacts are detected, the method 600 continues to block 615.

With reference to block 615, in response to detection of certain vehicle impacts, the method 600 includes actuating the pyrotechnic device 36 to disengage the pin 32. The vehicle computer 92 may send a signal to the pyrotechnic device 36 to activate. The pin 32 moves from the first extended position to the retracted position to allow the hook 28 to move to the retracted position. After the pyrotechnic device 36 is activated, the method 600 ends.

In addition to the step discussed above relating to block 615, block 615 may include rotating the seatbelt buckle 18. For example, the mechanism 100 may be activated to rotate the seatbelt buckle 18 relative to the seat 12.

The disclosure has been described in an illustrative manner, and it is to be understood that the terminology which has been used is intended to be in the nature of words of description rather than of limitation. The numerical adjectives "first" and "second" may be used interchangeably and are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
    a vehicle seat having a first side and a second side spaced cross-seat from the first side;
    a seatbelt buckle fixed to the first side of the vehicle seat;
    a seatbelt assembly including a latch plate and a webbing, the latch plate being engageable with the seatbelt buckle;
    the webbing including a lap portion defined by the latch plate when the latch plate is engaged with the seatbelt buckle;
    a hook retractably supported by the second side of the vehicle seat, the hook being retractable relative to the vehicle seat from a first position to a retracted position and the hook being engageable with the lap portion of the webbing as the hook retracts from the first position to the retracted position;
    a lock including a pin and a spring biasing the pin toward the hook, the pin being engageable with the hook when the hook is in the first position and the retracted position; and
    a pyrotechnic device operatively coupled to the lock to disengage the pin from the hook when the hook is in the first position.

2. The vehicle of claim 1, further comprising a second spring coupled to the hook, the second spring biasing the hook toward the retracted position.

3. The vehicle of claim 2, further comprising a track supported by the second side of the vehicle seat, the hook being slidably supported by the track and the second spring being between the track and the hook.

4. The vehicle of claim 3, wherein the hook is retractable relative to the track from the first position to the retracted position by the second spring.

5. The vehicle of claim 3, wherein the hook includes an end and the track includes an end, the end of the hook being spaced from the end of the track by a first distance in the first position and the end of the hook being spaced from the end of the track by a second distance in the retracted position that is shorter than the first distance.

6. The vehicle of claim 5, wherein the second spring extends from the end of the hook to the end of the track, the second spring biasing the end of the hook toward the end of the track.

7. The vehicle of claim 2, wherein the spring is elongated along a first axis and the second spring is elongated along a second axis transverse to the first axis.

8. The vehicle of claim 7, wherein the hook defines a first hole and a second hole spaced from the first hole along the first axis, the first hole and the second hole each being elongated along the second axis.

9. The vehicle of claim 1, wherein the lock includes a housing, the pin being slidable relative to the housing and the spring being between the housing and the pin.

10. The vehicle of claim 1, wherein the pin is movable from a first extended position to a retracted position when the hook is in the first position and the pin is movable from the retracted position to a second extended position when the hook is in the retracted position, the pyrotechnic device being operatively coupled to the pin to move the pin from the first extended position to the retracted position and the spring biasing the pin toward the second extended position.

11. The vehicle of claim 1, further comprising a track supported by the second side of the vehicle seat, the hook being retractable along the track from the first position to the retracted position.

12. The vehicle of claim 11, wherein the hook includes a first elongated portion, a second elongated portion spaced from the first elongated portion, and a curved portion between the first elongated portion and the second elongated portion, the first elongated portion being slidably supported by the track.

13. The vehicle of claim 12, wherein the curved portion being engageable with the lap portion of the webbing in the retracted position.

14. The vehicle of claim 12, wherein the lap portion of the webbing is between the first elongated portion and the second elongated portion in the retracted position.

15. The vehicle of claim 11, wherein the hook includes an end and the track includes an end, the end of the hook being spaced from the end of the track by a first distance in the first position and the end of the hook being spaced from the end of the track by a second distance in the retracted position that is shorter than the first distance.

16. The vehicle of claim 1, wherein the hook defines a first hole and a second hole spaced from the first hole, the pin of the lock being engageable with the first hole in the first position and the pin of the lock being engageable with the second hole in the retracted position.

17. The vehicle of claim 1, wherein the hook includes a first elongated portion, a second elongated portion spaced from the first elongated portion, and a curved portion between the first elongated portion and the second elongated portion, the curved portion being engageable with the lap portion of the webbing in the retracted position.

18. The vehicle of claim 17, wherein the lap portion of the webbing is between the first elongated portion and the second elongated portion in the retracted position.

19. The vehicle of claim 1, further comprising a computer including a processor and a memory storing instructions executable by the processor to:
  detect certain vehicle impacts; and
  actuate the pyrotechnic device to disengage the pin.

\* \* \* \* \*